(12) United States Patent
Mandel et al.

(10) Patent No.: US 9,767,438 B2
(45) Date of Patent: Sep. 19, 2017

(54) PRESENTATION AND SORTING OF EMAIL

(75) Inventors: Carl Mandel, Toronto (CA); David Mandel, Los Angeles, CA (US)

(73) Assignee: Bitvore Corp., Los Angeles, CA (US)

( * ) Notice: Subject to any disclaimer, the term of this patent is extended or adjusted under 35 U.S.C. 154(b) by 331 days.

(21) Appl. No.: 12/836,446

(22) Filed: Jul. 14, 2010

(65) Prior Publication Data

US 2011/0072363 A1    Mar. 24, 2011

(51) Int. Cl.
*G06Q 10/10*    (2012.01)

(52) U.S. Cl.
CPC .................................. *G06Q 10/107* (2013.01)

(58) Field of Classification Search
CPC ..................................................... G06Q 10/107
USPC ......................................................... 715/752
See application file for complete search history.

(56) References Cited

U.S. PATENT DOCUMENTS

| | | | |
|---|---|---|---|
| 2005/0004990 A1* | 1/2005 | Durazo et al. ................ | 709/206 |
| 2005/0160372 A1* | 7/2005 | Gruen et al. .................. | 715/810 |
| 2006/0173824 A1* | 8/2006 | Bensky et al. .................... | 707/3 |
| 2006/0188084 A1* | 8/2006 | Rogers et al. ........... | 379/265.01 |
| 2006/0200764 A1* | 9/2006 | Sellers et al. ................. | 715/526 |
| 2006/0242121 A1* | 10/2006 | DeVorchik et al. ............. | 707/3 |
| 2009/0319911 A1* | 12/2009 | McCann et al. .............. | 715/752 |
| 2011/0265036 A1* | 10/2011 | Hoehne .................. | B60K 35/00 715/810 |

* cited by examiner

*Primary Examiner* — Jennifer To
*Assistant Examiner* — Ashley Fortino
(74) *Attorney, Agent, or Firm* — McAndrews, Held & Malloy, Ltd.

(57) ABSTRACT

The system provides a method and process for displaying and sorting messages in a communication system. The system allows multiple folders of messages to be opened simultaneously. The system also displays sent and received messages in the same display when desired. The system includes automatic and/or custom color coding of messages for ease of identification of message types, sent or received messages, root sender, cc messages, responsive messages, etc. The system also includes a unique navigation system to allow the user to more easily move through related messages, threads, and folders. The navigation system can be used in situations where the prior art would have required a search to be executed.

17 Claims, 11 Drawing Sheets

| | | |
|---|---|---|
| Legal Issues | | 01/03/2009  4 |
| Business Emails | | 1 hr ago  8 |
| From | Subject | Received |
| gwen@xcompany.ca | Lost Mutual Funds | Feb/12/09 10am △ |

Send | To | Save as Draft | Attachment

To: gwen@xcompany.com, davidm@aolco.com, judy@rogers.com

Cc: john@lwyers.com, ohnh@lwyers.com, teresa@xzco.com, johnh@lwyers.com

Bcc: Reza@ABCo.com

206 — To: gw... Cc: jol... Gwen, Lorem ... risus. ... bibend... augue.

103 — To: cmandel@e-company.ca    Feb/12/09 10:45
Cc: Teresa, Greg K.

Carl,
Curabitur vulputate felis a velit lobortis mollis. Suspendisse convallis facilisis eros id condimentum. Praesent vitae enim, dui quis consectetur ornare, mauris lorem hendrerit orci, non eleifend nibh ante a est. Sed ultricies justo eget purus ornare quis lacinia lorem sollicitudin.

Make sure you include the organizational charts

Vestibulum ullamcorper, massa sit amet laoreet eleifend, orci magna euismod lectus, a tempus lorem arcu vitae odio. Cras at congue risus. Fusce auctor justo ut lorem commodo suscipit. Proin in lectus felis. Proin quis lorem nibh. a tempus lorem arcu vitae odio.

| davidm@aolco.com | Payment for Invoice | 01/01/2009 △ |
| judy@rogers.com | Trip to Florida/US ... | 01/01/2009 |
| johnh@lwyers.com | Litigation Case & US .... | 02/12/2009 |
| davidm@aolco.com | Payment for invoice | 01/01/2009 |
| judy@rogers.com | Trip to Florida/US funds | 01/01/2009 |
| johnh@lwyers.com | Litigation Case & US .... | 02/12/2009 |
| davidm@aolco.com | Payment for invoice | 01/01/2009 |

| | | |
|---|---|---|
| judy@rogers.com | Trip to Florida/US ... | 01/01/2009 |
| johnh@lwyers.com | Litigation Case & US rules | 02/12/2009 |
| davidm@aolco.com | Payment for invoice | 01/01/2009 |
| judy@rogers.com | Trip to Florida/US funds | 01/01/2009 |
| johnh@lwyers.com | Litigation Case & US .... | 02/12/2009 |

Banking/Investment Contacts — 2.5 hrs ago (12)

Cooper's Classmates — 03/03/2009 (3)

SENT Emails — 03/03/2009

Investment Info/Reports — 10/03/2009

| | | |
|---|---|---|
| gwen@xcompany.com | Lost Mutual Funds | 01/01/2009 |
| davidm@aolco.com | Payment for Invoice | 01/01/2009 | judy@rogers.com — Trip to Florida/US ... — 01/01/2009

To: cmandel@e-company.ca
Cc: Teresa, Greg K.

Carl,
Curabitur vulputate felis a velit lobortis mollis. Suspendisse convallis facilisis eros id condimentum. Praesent vitae enim, dui quis consectetur ornare, mauris lorem hendrerit orci, non eleifend nibh ante a est. Sed ultricies justo eget purus ornare quis lacinia lorem sollicitudin.

| | | | |
|---|---|---|---|
| Legal Issues | | | 01/03/2009  4 |
| Business Emails | | | 1 hr ago  8 |
| From | Subject | Received | |
| gwen@xcompany.ca | Lost Mutual Funds | Feb/12/09 10am | △ |

(Send) (To)                              (Save as Draft) (Attachment)

To: gwen@xcompany.com, davidm@aolco.com, judy@rogers.com
Cc: john@lwyers.com, teresa@xzco.com, johnh@lwyers.com Gwen,
Lorem ipsum dolor sit amet, consectetur adipiscing elit. Curabitur nec arcu risus. Maecenas cursus pulvinar metus vitae lacinia. Maecenas fermentum bibendum ultrices. Quisque sit amet elit quis ante placerat dignissim eu id augue.

To: cmandel@e-company.ca                     Feb/12/09 10:45
Cc: Teresa, Greg K.

Carl,
Curabitur vulputate felis a velit lobortis mollis. Suspendisse convallis facilisis eros id condimentum. Praesent vitae enim, dui quis consectetur ornare, mauris lorem hendrerit orci, non eleifend nibh ante a est. Sed ultricies justo eget purus ornare quis lacinia lorem sollicitudin.

Make sure you include the organizational charts

Vestibulum ullamcorper, massa sit amet laoreet eleifend, orci magna euismod lectus, a tempus lorem arcu vitae odio. Cras at congue risus. Fusce auctor justo ut lorem commodo suscipit. Proin in lectus felis. Proin quis lorem nibh. a tempus lorem arcu vitae odio.

| From | Subject | Received | |
|---|---|---|---|
| davidm@aolco.com | Payment for invoice | 01/01/2009 | △ |
| judy@rogers.com | Trip to Florida/US ... | 01/01/2009 | |
| johnh@lwyers.com | Litigation Case & US .... | 02/12/2009 | |
| davidm@aolco.com | Payment for invoice | 01/01/2009 | |
| judy@rogers.com | Trip to Florida/US funds | 01/01/2009 | |
| johnh@lwyers.com | Litigation Case & US .... | 02/12/2009 | |
| davidm@aolco.com | Payment for invoice | 01/01/2009 | |
| judy@rogers.com | Trip to Florida/US ... | 01/01/2009 | |
| johnh@lwyers.com | Litigation Case & US rules | 02/12/2009 | |
| davidm@aolco.com | Payment for invoice | 01/01/2009 | |
| judy@rogers.com | Trip to Florida/US funds | 01/01/2009 | |
| johnh@lwyers.com | Litigation Case & US .... | 02/12/2009 | ▽ |

Banking/Investment Contacts                    2.5 hrs ago  12

FIGURE 4

| Legal Issues | | 01/03/2009 | 4 |
|---|---|---|---|
| Business Emails | | 1 hr ago | 8 |
| From | Subject | Received | |
| gwen@xcompany.ca | Lost Mutual Funds | Feb/12/09 10am | △ |

Send | To | Save as Draft | Attachment

To: gw
Cc: joh

To: gwen@xcompany.com, davidm@aolco.com, judy@rogers.com

Cc: john@lwyers.com, ohnh@lwyers.com, teresa@xzco.com, johnh@lwyers.com

Bcc: Reza@ABCo.com

Gwen,
Lorem
risus. N
bibend
augue.

nec arcu
rmentum
im eu id

To: cmandel@e-company.ca        Feb/12/09 10:45
Cc: Teresa, Greg K.

Carl,
Curabitur vulputate felis a velit lobortis mollis. Suspendisse convallis facilisis eros id condimentum. Praesent vitae enim, dui quis consectetur ornare, mauris lorem hendrerit orci, non eleifend nibh ante a est. Sed ultricies justo eget purus ornare quis lacinia lorem sollicitudin.

Make sure you include the organizational charts

Vestibulum ullamcorper, massa sit amet laoreet eleifend, orci magna euismod lectus, a tempus lorem arcu vitae odio. Cras at congue risus. Fusce auctor justo ut lorem commodo suscipit. Proin in lectus felis. Proin quis lorem nibh. a tempus lorem arcu vitae odio.

| davidm@aolco.com | Payment for invoice | 01/01/2009 | △ |
|---|---|---|---|
| judy@rogers.com | Trip to Florida/US ... | 01/01/2009 | |
| johnh@lwyers.com | Litigation Case & US .... | 02/12/2009 | |
| davidm@aolco.com | Payment for invoice | 01/01/2009 | |
| judy@rogers.com | Trip to Florida/US funds | 01/01/2009 | |
| johnh@lwyers.com | Litigation Case & US .... | 02/12/2009 | |
| davidm@aolco.com | Payment for invoice | 01/01/2009 | |
| judy@rogers.com | Trip to Florida/US ... | 01/01/2009 | |
| johnh@lwyers.com | Litigation Case & US rules | 02/12/2009 | |
| davidm@aolco.com | Payment for invoice | 01/01/2009 | |
| judy@rogers.com | Trip to Florida/US funds | 01/01/2009 | |
| ohnh@lwyers.com | Litigation Case & US .... | 02/12/2009 | ▽ |
| Banking/Investment Contacts | | 2.5 hrs ago | 12 |

FIGURE 5

PRESENTATION AND SORTING OF EMAIL

This patent application claims priority to U.S. Provisional Patent Application No. 61/225,536 filed on Jul. 14, 2009, and to U.S. Provisional Patent Application No. 61/262,456 filed on Nov. 18, 2009, both of which are incorporated by reference herein in their entireties.

BACKGROUND OF THE SYSTEM

Field of the Invention

The invention relates generally to a system of sorting and presenting email.

Background of the Invention

There are a number of email applications used for sending and receiving email. Examples include email clients such as Microsoft Outlook, Eudora, Mozilla Thunderbird, and GnuMail, and browser based email systems such as YahooMail and GoogleMail. Regardless of the system, prior art email clients have a number of disadvantages.

One disadvantage of prior art email systems is the limitation in presentation and sorting of email messages. Many systems allow a user to establish rules to sort incoming messages into folders automatically. In Outlook, for example, there is a rules wizard for defining conditions for incoming and outgoing email messages to be automatically placed into specific folders. Messages can also be color coded using the rules wizard so that certain to or from messages will be in a selected color.

A disadvantage of the sorting rules and system used by Outlook and other email systems is the limited visibility of message folders or defined groups of emails. There is also an inability to clearly display and message threads that contain both received and sent messages. In Outlook, there are separate folders for sent messages and for received messages. It is possible to look at a thread (as long as it contains the same subject line) of all sent messages, or all received messages (again, only if it has the same subject line) but not to see both sent and received in the same view.

Another disadvantage is that only one folder can be viewed at one time. The system includes a viewing pane that displays all the messages from a folder. In addition, the folder is displayed in a different region of the display from the messages themselves. Without double checking, it is easy to forget which folder is being accessed at any one time. There are also times when it would be useful to have two or more folders opened at the same time. However, prior art systems lack that capability.

In addition, it is often difficult to follow email threads and strings in prior art systems without executing a search. This has the disadvantage of putting the email system in a search mode where normal functions are not accessible without interrupting the search. In addition, the search is not saved so that it is not possible to toggle back and forth between two searches or between a search and the normal view of the email system. The need for searches slows down operability and limits functionality.

BRIEF SUMMARY OF THE SYSTEM

The system provides a method and process for displaying and sorting messages in a communication system. The system allows multiple folders of messages to be opened simultaneously. The system also displays sent and received messages in the same display when desired. The system includes automatic and/or custom color coding of messages for ease of identification of message types, sent or received messages, root sender, cc messages, responsive messages, etc. The system also includes a unique navigation system to allow the user to more easily move through related messages, threads, and folders. The navigation system can be used in situations where the prior art would have required a search to be executed. The system is not limited to email but may be used for any type of communications, including, but not limited to, bulletin board messages, SMS messages, Twitter messages, social network communications and other communications. In addition, the system allows for the inclusion of transactional information, including financial transactions, physical movement, asset deployment, or other acts or activities that may be related to, or independent of, the communications.

BRIEF DESCRIPTION OF THE DRAWINGS

FIGS. 2A and 2B are a second view of an inbox configuration in one embodiment of the system.

FIG. 4 is a fourth view of an inbox configuration in one embodiment of the system.

FIG. 5 is a fifth view of an inbox configuration in one embodiment of the system.

DETAILED DESCRIPTION OF THE SYSTEM

Figure 1A:
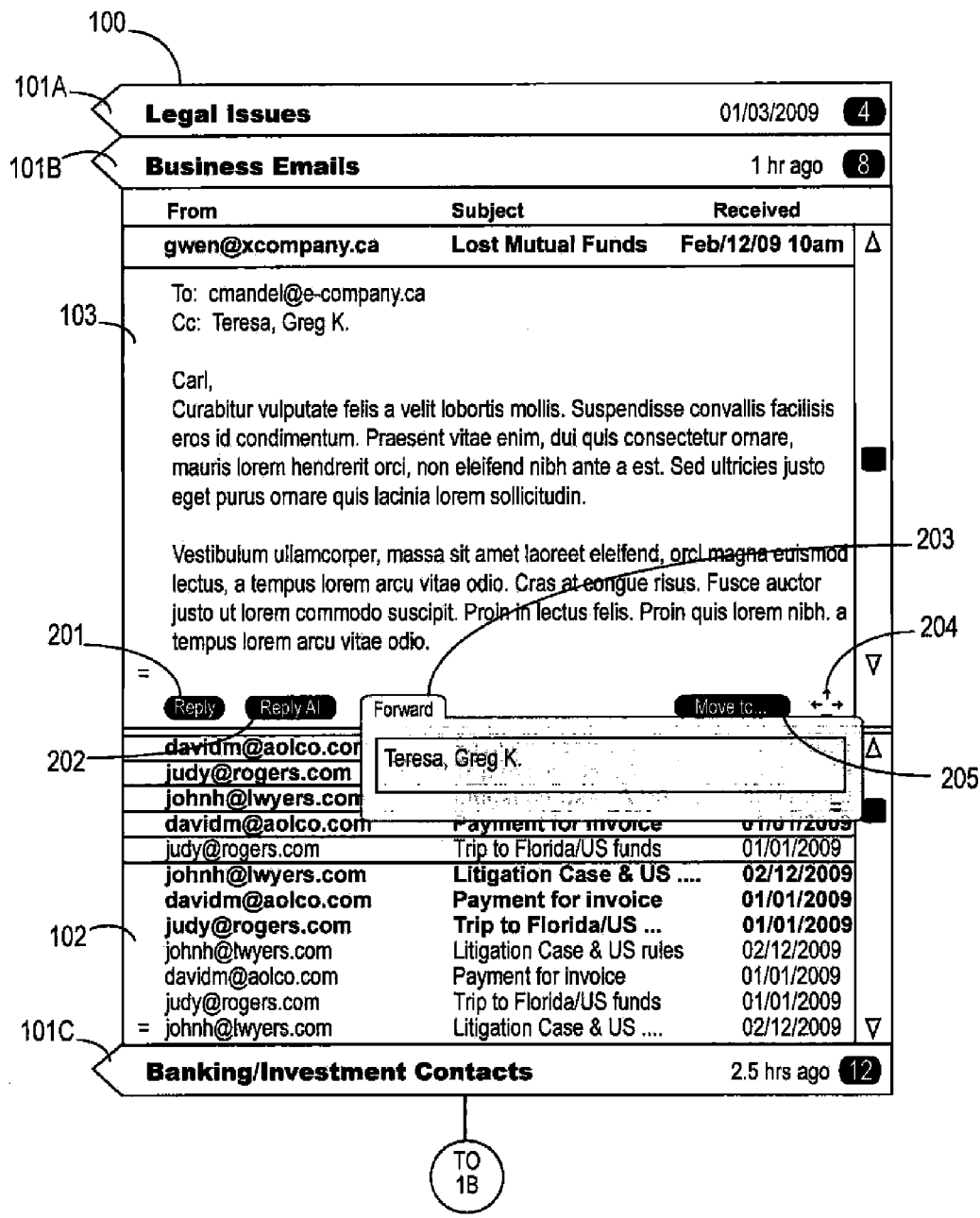
FIGS. 1A and 1B are a first view of an inbox configuration in one embodiment of the system.
Figure 1B:
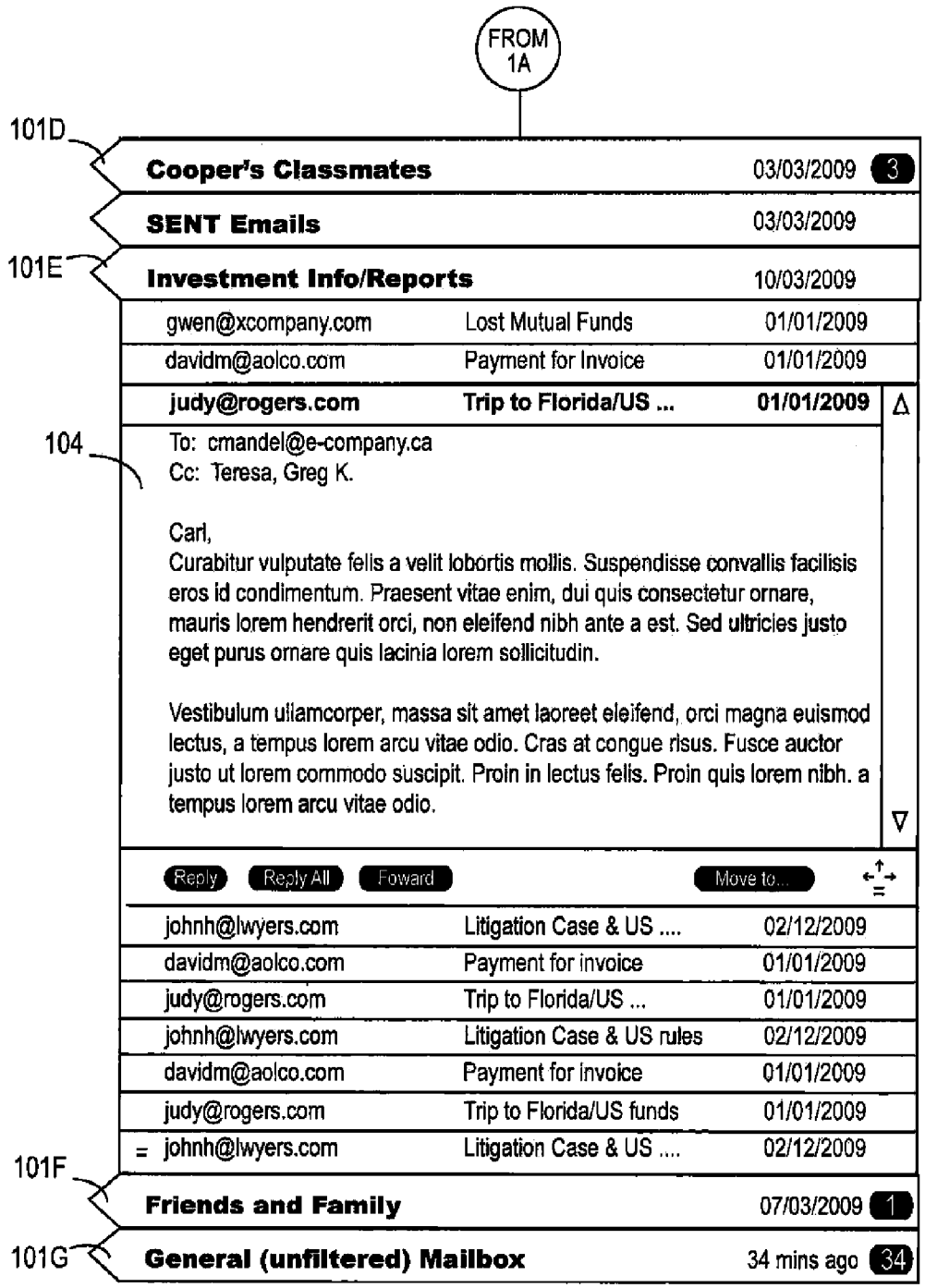

The present system provides a method and process for displaying and sorting messages in a communication system. FIGS. 1A and 1B illustrates a first view of an inbox configuration in one embodiment of the system. In this embodiment, the inbox 100 is defined by a plurality of folders such as folders that represent related emails or other messages or communications. The system allows the user freedom to define and name the folders as desired. In addition, if desired, an email may be represented in more than one folder or it may be constrained to a single folder as desired.

In the example shown, the folders include, by way of example, Legal Issues 101A, Business Emails 101B, Banking/Investment Contacts 101C, Cooper's Classmates 101D, Investment Info/Reports 101E, Friends and Family 101F, and General 101G. In one embodiment, the General folder 101G may be unfiltered so that all emails that are not associated with a defined folder are stored in the General folder. The system also includes a Sent Emails folder that can contain all sent emails from the user of the system. In one embodiment, there may be a separate Sent Emails folder for each of the folders 101A-101G. The system contemplates allowing the user to define rules for sorting and assembling the emails into specific folders. In one embodiment, the system can use a heuristic approach to automatically place emails into an associated folder.

The system presents additional information about each folder. For example, in the right hand area of the header of each folder there is a timestamp representing the time and/or date of the most recent activity in that folder. For updates less than an hour old, the system indicates the number of minutes since the last update, as seen in General folder 101G. If it is between an hour and 24 hours, the system indicates the number of hours since the last update as in folders 101B and 101C. For updates over one day old, the date of the most recent update is provided as in folders 101A and 101D.

In addition, each folder includes a numeric indicator representing the status of messages in the folder. The numeric indicator may represent the number of unread messages in a folder so that the user has an immediate idea of new messages that require attention. In other embodiments, the numeric indicator can represent the total number of messages in a folder. The presence of new messages may be represented by a darker color of the numeric indicator or by blinking or flashing of the numeric indicator.

In one embodiment, a shadow folder may be provided that houses all unread messages so that the user can easily find new messages without examining each individual folder. In this embodiment, the messages also appear at the same time in each sorted folder, also with an indicator of unread messages, so that the user can use either method of identifying and accessing unread messages. In one embodiment, after a user has read a message in the shadow folder, the message leaves that folder but remains in the proper sorted folder.

One of the advantages of the system is that the multi-folder view of FIGS. 1A and 1B can be the principal viewing pane of the email system. This is in contrast to other email clients where the folder view is in a secondary viewing pane. Another advantage of the system illustrated in FIGS. 1A and 1B is the ability to have multiple folders opened at the same time. This is in contrast with the prior art where only one folder can be opened at time.

For example, in FIGS. 1A and 1B, both the Business Emails folder 101B and the Investment Info/Reports folder 101E are open at the same time. When the folders are open, the most recent emails in the folder can be seen and a the elevator bar 102 can be used to scroll down to see more messages as desired.

To see one or more individual messages, the user can click on a message in the folder and the message will expand at that location to be visible. In FIGS. 1A and 1B, there is a message 103 open in folder 101B and a message 104 open in folder 101E. (Note that the message itself is scrollable as well if the display portion is not large enough to show the entire message. In prior art systems, typically only one message is displayed at a time.

Figure 7:
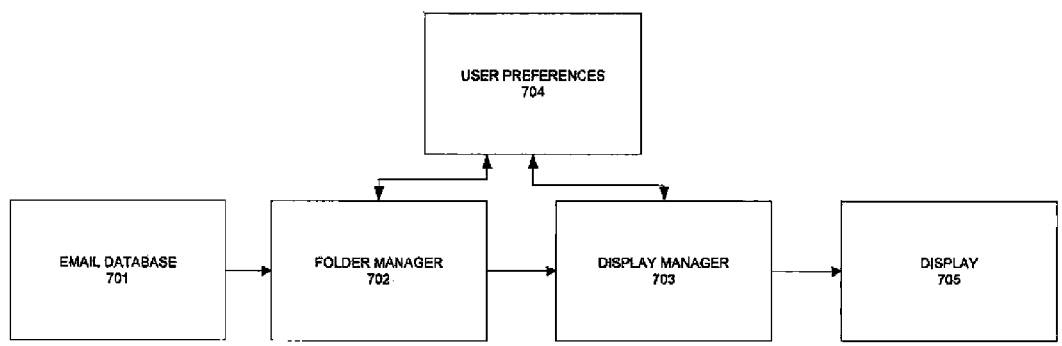
FIG. 7 is a block diagram of an embodiment of the system.

FIG. 7 is a block diagram of a system for implementing an embodiment of the system. An email database 702 stores sent and received emails. A folder manager 702 sorts the emails into the proper folders as determined by user preferences from the preferences database 704. The folder manager provides the sorted folders to the display manager 703 which assembles a display for the also based on user preferences 704. The assembled information is provided to the display 705.

Another useful feature of the system is shown in FIGS. 2A and 2B. When a message is opened, a number of buttons appear that allow manipulation, navigation, and management of the message. For example, message 103 shows buttons 201 (reply), 202 (reply all), 203 (forward), 204 (navigation tool) and 205 (move to). In FIGS. 2A and 2B, the user has selected the reply button 201 and a space is created for a reply message 206 immediately above the message 103. This presentation approach differs from the prior art which typically opens a new and separate window for a reply message. Note that even though the user is actively responding to a message, the previously opened messages 103 and 104 remain open.

If the user changes his mind about composing, forwarding, or replying to an email while the pending message 206 is displayed, the user can back out of the operation by clicking anywhere in the potential reply message 206, by using the navigation tool, or by some other close out command. The system also allows the user to interact with text in any of the displayed messages. For example, by clicking the cursor within the text area of displayed message 103 in FIGS. 2A and 2B, the user is able to highlight and copy text as desired. This can occur even when other messages are open and even when a draft new, reply, or forward message is open. The system removes the modality of prior art systems and provides a single interface that allows interaction with all messages as desired.

The system also allows folders to be opened and closed even when a pending forward or reply message is visible. The user is also free to scroll down the page as desired, even to the point of hiding a pending message. The pending message will still be visible when scrolling the screen back to that area.

The scrolling can be accomplished via scroll bars or via the navigation tool described in more detail below.

Management Tools

Figure 3:
FIG. 3 is a third view of an inbox configuration in one embodiment of the system.

FIG. 3 illustrates management tools in an embodiment of the system. When a message is expanded, a number of management tools appear coincident with the message. The tools are available at each expanded message so that the user need not mouse to the top of the page (although that remains an option) to take action with the expanded message. In one embodiment the management tools include Reply 201, Reply All 202, Forward 203, Move To 205, and trident navigation tool 204. In addition, in one embodiment, the size of an expanded message is substantially consistent such that if the body of the message is of a length that cannot be displayed in that region of space, a scroll bar is automatically provided.

FIG. 3 shows the operation of managing a message. When mousing over one of the management buttons 201-205, an active box (with a cursor) appears that is in the mode of the underlying, button. Here the user has moused over Forward button 203 and box 301 has appeared. The user can begin typing one or more addresses in this box (note that the box has a selectable auto-complete feature if desired). After one or more addresses are entered and the box 301 closed, a message frame appears above the current message so the user can input the body of the user's message in forwarding or replying.

FIGS. 4 and 5 show additional management buttons that appear in a reply (or forwarded) message. The navigation button 204 appears on the new message along with send 401, To 402 (which includes to:, cc:, and bcc), Save 403 and Attach 404. When mousing over these buttons, active boxes appear that allow the user to enter addresses, choose a save location, find and add attachments, etc.

FIG. 5 illustrates the operation of the To 402 command. When the user mousse over To 402, the system provides an address field that includes to, cc, and bcc options for the user.

Figure 6:
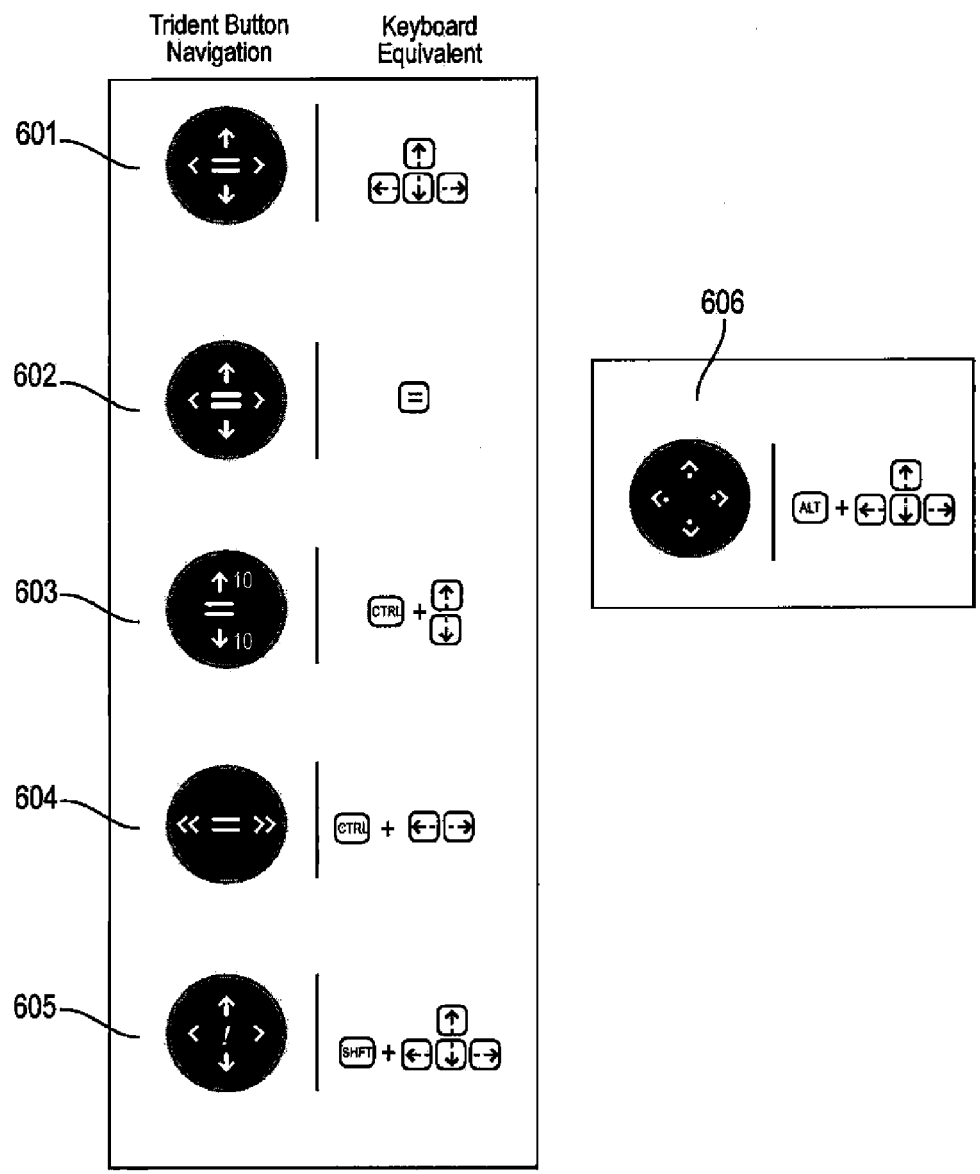
FIG. 6 illustrates the navigation button of an embodiment of the system.

FIG. 6 is a view of the navigation button of the system. The navigation button provides new navigational options for the user. The navigation tool in one embodiment typically appears as at 601 and 602. The tool has four directional arrows (up, down, left, right) which can be accessed by clicking on the tool or by using the arrow keys on the keyboard. Clicking on one of the directional arrows will move the user one step where the step depends on where the user is accessing the tool. If the user is at a folder level, a single click on an arrow will move the user to the next folder. If the user is inside a folder and accessing a message, the directional arrows will move from message to message within the folder.

Clicking on the equal sign, or using the equal sign on the keyboard, will toggle the expansion or contraction of a folder or message, depending on where the navigation tool is accessed. When a message or folder is highlighted, the keyboard is active for the navigation tool in the highlighted object.

By clicking the ctrl button on the keyboard, the navigation tool appears as at 603. In this case, the up and down arrows show a number that represents how many steps in the chain each click of an arrow will advance. Within a folder, a click will move the user ten messages up or down for example. The left and right arrows at 604 when the ctrl button is pressed will move the user another screen if the display cannot show the entire inbox at once.

Clicking on the shift key causes the navigation tool to appear as at 605. This mode ties into, for example, a search operation. The user can define a term or terms, and each click of the directional arrows will move the user to the next message that satisfies the search criteria.

Alt clicking causes the navigation tool to appear as at 606. This allows the user to move through threads of emails, i.e. replies and forwards of related emails. This allows navigation without needing to re-order the display of emails to be by subject for example.

Figure 8:
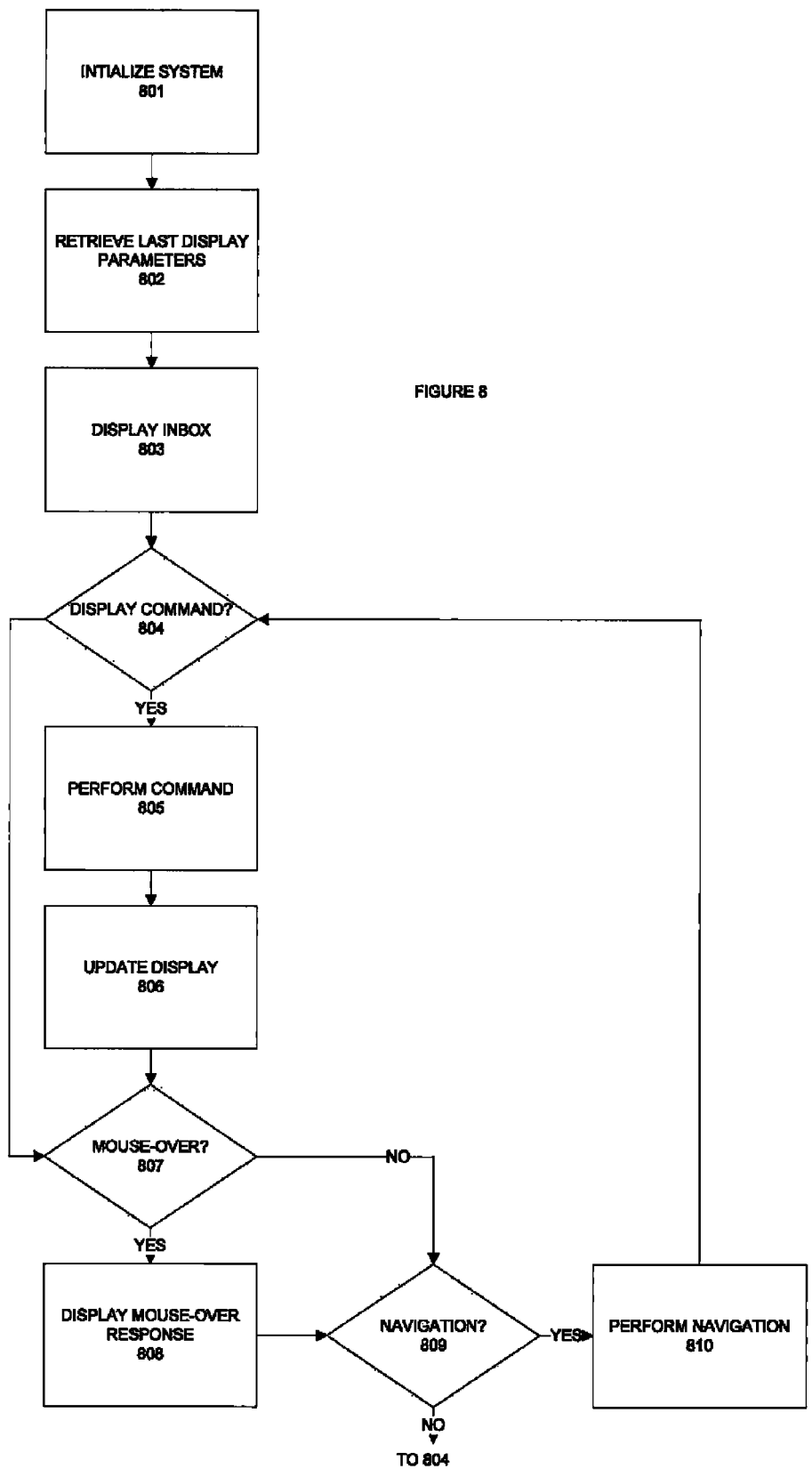
FIG. 8 is a flow diagram of the operation of the system.

FIG. 8 is a flow diagram of the operation of an embodiment of the system. At step 801 the system opens the inbox of the user. At step 802 the system retrieves the status of the inbox the last time that it was opened and uses those parameters to display the inbox at step 803. This means that any folders or messages that were expanded when the system was closed will be expanded when the inbox is re-opened.

At step 804 the system checks for display change commands from the user. For example, the system checks to see if the user has expanded or contracted folders or messages. If so, the system performs the command at step 805. At step 806 the system updates the display accordingly and adds management tools and navigation tools as appropriate.

If not, the system proceeds to step 807 and checks for mouse-over events. If so, the system responds with the appropriate display at step 808. If not, the system proceeds to step 809 to check for navigation commands. If so, the system performs the command at step 810. If not, the system returns to step 804.

Example Computer System

Figure 9:
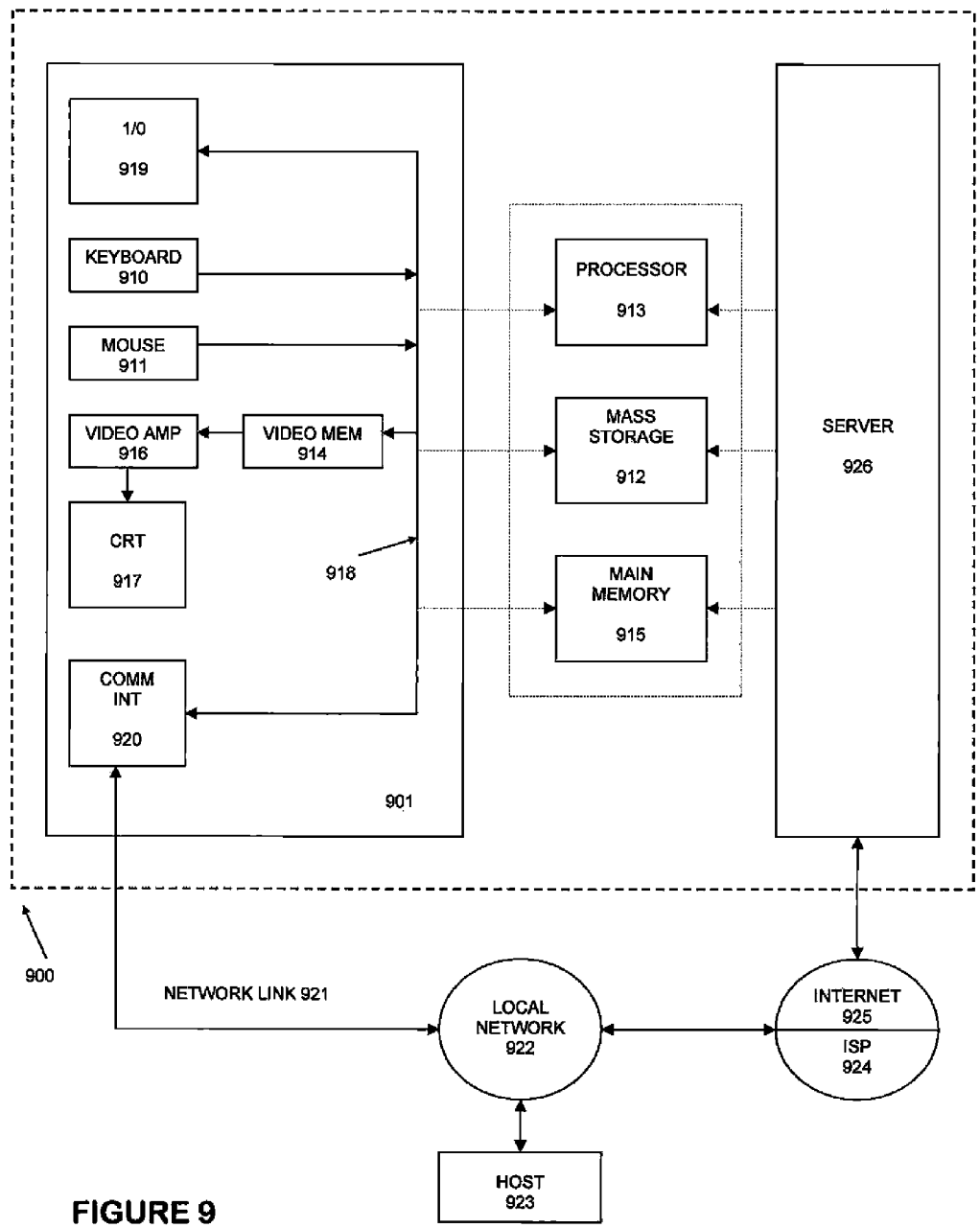
FIG. 9 is an example computer system of an embodiment of the system.

An embodiment of the system can be implemented as computer software in the form of computer readable program code executed in a general purpose computing environment such as environment 900 illustrated in FIG. 9, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 910 and mouse 911 are coupled to a system bus 918. The keyboard and mouse are for introducing user input to the computer system and communicating, that user input to central processing unit (CPU 913. Other suitable input devices may be used in addition to, or in place of, the mouse 911 and keyboard 910, such as a tablet PC, iPad, touchscreen device, smartphone/PDA, etc. I/O (input/output) unit 919 coupled to bi-directional system bus 918 represents such I/O elements as a printer, A/V (audio/video) I/O, etc.

Computer 901 may include a communication interface 920 coupled to bus 918. Communication interface 920 provides a two-way data communication coupling via a network link 921 to a local network 922. For example, if communication interface 920 is an integrated services digital network (ISDN) card or a modem, communication interface 920 provides a data communication connection to the corresponding type of telephone line, which comprises part of network link 921. If communication interface 920 is a local area network (LAN) card, communication interface 920 provides a data communication connection via network link 921 to a compatible LAN. Wireless links are also possible. In any such implementation, communication interface 920 sends and receives electrical, electromagnetic or optical signals which carry digital data streams representing various types of information.

Network link 921 typically provides data communication through one or more networks to other data devices. For example, network link 921 may provide a connection through local network 922 to local server computer 923 or to data equipment operated by ISP 924. ISP 924 in turn provides data communication services through the world wide packet data communication network now commonly referred to as the "Internet" 925 Local network 922 and Internet 925 both use electrical, electromagnetic or optical signals which carry digital data streams. The signals through the various networks and the signals on network link 921 and through communication interface 920, which carry the digital data to and from computer 900, are exemplary forms of carrier waves transporting the information.

Processor 913 may reside wholly on client computer 901 or wholly on server 926 or processor 913 may have its computational power distributed between computer 901 and server 926. Server 926 symbolically is represented in FIG. 9 as one unit, but server 926 can also be distributed between multiple "tiers". In one embodiment, server 926 comprises a middle and back tier where application logic executes in the middle tier and persistent data is obtained in the back tier. In the case where processor 913 resides wholly on server 926, the results of the computations performed by processor 913 are transmitted to computer 901 via Internet 925, Internet Service Provider (ISP) 924, local network 922 and communication interface 920. In this way, computer 901 is able to display the results of the computation to a user in the form of output.

Computer 901 includes a video memory 914, main memory 915 and mass storage 912, all coupled to bi-directional system bus 918 along with keyboard 910, mouse 911 and processor 913.

As with processor 913, in various computing environments, main memory 915 and mass storage 912, can reside wholly on server 926 or computer 901, or they may be distributed between the two. Examples of systems where processor 913, main memory 915, and mass storage 912 are distributed between computer 901 and server 926 include thin-client computing architectures and other personal digital assistants, Internet ready cellular phones and other Internet computing devices, and in platform independent computing environments, The mass storage 912 may include both fixed and removable media, such as magnetic, optical or magnetic optical storage systems or any other available mass storage technology. The mass storage may be implemented as a RAID array or any other suitable storage means. Bus 918 may contain, for example, thirty-two address lines for addressing video memory 914 or main memory 915. The system bus 918 also includes, for example, a 32-bit data bus for transferring data between and among the components, such as processor 913, main memory 915, video memory 914 and mass storage 912. Alternatively, multiplex data/address lines may be used instead of separate data and address lines.

In one embodiment of the invention, the processor 913 is a microprocessor such as manufactured by Intel, AMD, Sun, etc. However, any other suitable microprocessor or microcomputer may be utilized. Main memory 915 is comprised of dynamic random access memory (DRAM). Video memory 914 is a dual-ported video random access memory. One port of the video memory 914 is coupled to video amplifier 916. The video amplifier 916 is used to drive the cathode ray tube (CRT) raster monitor 917. Video amplifier 916 is well known in the art and may be implemented by any suitable apparatus. This circuitry converts pixel data stored in video memory 914 to a raster signal suitable for use by monitor 917. Monitor 1917 is a type of monitor suitable for displaying graphic images, such as computer monitor, tablet PC, iPad, smartphone/PDA, touchscreen device, etc Computer 901 can send messages and receive data, including program code, through the network(s), network link 921, and communication interface 920. In the Internet example, remote server computer 926 might transmit a requested code for an application program through Internet 925, ISP 924, local network 922 and communication interface 920. The received code maybe executed by processor 913 as it is received, and/or stored in mass storage 912, or other non-volatile storage for later execution. In this manner, computer 900 may obtain application code in the form of a carrier wave. Alternatively, remote server computer 926 may execute applications using processor 913, and utilize mass storage 912, and/or video memory 915. The results of the execution at server 926 are then transmitted through Internet 925, ISP 924, local network 922 and communication interface 920. In this example, computer 901 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

What is claimed:

1. A method for displaying messages comprising
simultaneously displaying a plurality of folders;
simultaneously expanding a first folder and a second folder of the plurality of folders to display a plurality of messages, wherein each message in the plurality of messages is associated with one or more of the plurality of folders;
simultaneously expanding a first message and a second message of the plurality of messages, wherein the first message and the second message are associated with different folders;
selecting a navigation mode according to a key; and
moving through the plurality of messages to a message that satisfies a search criteria according to the navigation mode, wherein the moving in a first mode is up or down based on a user-defined search term that is independent of a previously executed search, wherein the moving in a second mode is up or down by a plurality of messages,
wherein the first folder and the second folder each display one or more buttons to allow interaction by a user, and for each of the first folder and the second folder, one of the one or more buttons is a navigation tool that includes a plurality of sub-buttons, wherein one of the sub-buttons allows a user to move to another folder which causes a different folder to be expanded; and
wherein the first message and the second message, once expanded, each display one or more buttons to allow interaction by a user and for each of the first message and the second message, one of the one or more buttons is a navigation tool that includes a plurality of sub-buttons, wherein at least one of the sub-buttons allows a user to move to another message which causes a different message to be expanded.

2. The method of claim 1 wherein the plurality of folders each display a numeric indicator, wherein the numeric indicator blinks or flashes when the folder contains new messages.

3. The method of claim 1 wherein the first message and the second message, once expanded, each display at least a portion of the body or text of the message.

4. The method of claim 3 wherein the body or text of the first message and the second message is each adapted to allow a user to interact with the text using a cursor.

5. A method for displaying messages comprising:
accessing a plurality of folders;
concurrently displaying and expanding a first folder and a second folder, each folder being from the plurality of folders to display a plurality of messages, wherein each message in the plurality of messages is associated with one or more of the plurality of folders;
concurrently displaying and expanding a first message and a second message, each message being from the plurality of messages, wherein the first message is associated with the first folder and the second message is associated with the second folder;
selecting a navigation mode according to a key; and
moving through the plurality of messages to a message that satisfies a search criteria according to the navigation mode, wherein the movement in a first mode is up or down based on a user-defined search term that is independent of a previously executed search, wherein the moving in a second mode is up or down by a plurality of messages,
wherein the first folder and the second folder each display one or more buttons to allow interaction by a user, and for each of the first folder and the second folder, one of the one or more buttons is a navigation tool that includes a plurality of sub-buttons, wherein one of the sub-buttons allows a user to move to another folder which causes a different folder to be expanded; and
wherein the first message and the second message, once expanded, each display one or more buttons to allow interaction by a user and for each of the first message and the second message, one of the one or more buttons is a navigation tool that includes a plurality of sub-buttons, wherein at least one of the sub-buttons allows a user to move to another message which causes a different message to be expanded.

6. The method of claim 5 wherein the first message and the second message, once expanded, each display at least a portion of the body or text of the message.

7. The method of claim 6 wherein the body or text of the first message and the second message is each adapted to allow a user to interact with the text using a cursor.

8. The method of claim 5 wherein the first message and the second message, once expanded, each display a scrollbar that is adapted to allow a user to view a particular portion of the body or text of the message.

9. The method of claim 5 wherein one of the sub-buttons allows a user to move to another message conversation in the same folder.

10. The method of claim 5 wherein one of the sub-buttons allows a user to move to another message in the same message conversation.

11. The method of claim 5 wherein one of the sub-buttons allows a user to page up or down in the message to display a different portion of the body or text of the message.

12. The method of claim 5 wherein, for each of the first message and the second message, one of the one or more buttons is adapted to expand into a window when engaged by a user, wherein the window displays information about the message and/or allows a user to enter information.

13. A method for displaying messages comprising:
accessing a first conversation that includes one or more messages, wherein the first conversation is associated with a first folder;
accessing a second conversation that includes one or more messages, wherein the second conversation is associated with a second folder;
concurrently displaying and expanding the first folder and the second folder to display a plurality of messages, wherein each message in the plurality of messages is associated with one or more of the plurality of folders;
concurrently displaying and expanding a first message and a second message, wherein the first message is from the one or more messages included in the first conversation and the second message is from the one or more messages included in the second conversation;
selecting a navigation mode according to a key; and
moving through the plurality of messages to a message that satisfies a search criteria according to the navigation mode, wherein the movement in a first mode is up or down based on a user-defined search term that is independent of a previously executed search, wherein the moving in a second mode is up or down by a plurality of messages,
wherein the first folder and the second folder each display one or more buttons to allow interaction by a user, and for each of the first folder and the second folder, one of the one or more buttons is a navigation tool that includes a plurality of sub-buttons, wherein one of the sub-buttons allows a user to move to another folder which causes a different folder to be expanded; and
wherein the first message and the second message, once expanded, each display one or more buttons to allow interaction by a user and for each of the first message and the second message, one of the one or more buttons is a navigation tool that includes a plurality of sub-buttons, wherein at least one of the sub-buttons allows a user to move to another message which causes a different message to be expanded.

14. The method of claim 13 wherein the first message is not associated with the second conversation and the second message is not associated with the first conversation.

15. The method of claim 5 wherein the first message and the second message, once expanded, each display at least a portion of the body or text of the message.

16. The method of claim 15 wherein the body or text of the first message and the second message is each adapted to allow a user to interact with the text using a cursor.

17. The method of claim 16 wherein the first message and the second message, once expanded, each display a scrollbar that is adapted to allow a user to view a particular portion of the body or text of the message.

* * * * *